United States Patent [19]

Wagner

[11] 4,012,990
[45] Mar. 22, 1977

[54] DEVICE FOR TRIMMING AND BEVELLING GEAR TEETH

[75] Inventor: André Wagner, Boulogne-Billancourt, France

[73] Assignee: Regie Nationale des Usines Renault, France

[22] Filed: Nov. 25, 1975

[21] Appl. No.: 635,038

[30] Foreign Application Priority Data

Nov. 28, 1974 France .............................. 74.39023

[52] U.S. Cl. .................................. 90/1.4; 51/52 R; 51/287
[51] Int. Cl.² ........................................ B23F 19/10
[58] Field of Search ............. 90/1.4, 1.3; 51/105 G, 51/287, 33 W, 52 R

[56] References Cited

UNITED STATES PATENTS

| | | | |
|---|---|---|---|
| 2,668,480 | 2/1954 | Christman | 90/1.4 |
| 2,865,257 | 12/1958 | Christman | 90/1.4 |
| 3,053,017 | 9/1962 | Rosenthal | 51/287 X |
| 3,286,593 | 11/1966 | Bibbens | 90/1.4 |
| 3,426,485 | 2/1969 | Yamaoka | 51/105 G |
| 3,554,079 | 1/1971 | Hunkeler et al. | 90/1.4 |
| 3,714,740 | 2/1973 | Steinhardt | 51/33 W |
| 3,766,688 | 10/1973 | Maytay | 51/287 X |
| 3,782,041 | 1/1974 | Batorski | 51/287 X |
| 3,802,314 | 4/1974 | Flint | 90/1.4 |

FOREIGN PATENTS OR APPLICATIONS

| | | | |
|---|---|---|---|
| 38,465 | 5/1965 | Germany | 90/1.4 |
| 1,066,840 | 10/1959 | Germany | 90/1.4 |
| 1,065,417 | 4/1967 | United Kingdom | 90/1.4 |

*Primary Examiner*—Francis S. Husar
*Assistant Examiner*—W. R. Briggs
*Attorney, Agent, or Firm*—Fleit & Jacobson

[57] ABSTRACT

A device for trimming, or removing burrs from, and bevelling, the teeth of gears and pinions comprises means for rotatably driving the gear to be treated, at least one milling head of which the cutter is adapted to engage the lateral edges of the gear teeth, a follower adapted to follow radially the tooth outline of the rotating gear, and means responsive to said follower for moving the cutter in a plane transversely to said gear in order to cause said cutter, in synchronism with the gear rotation and by temporary shape engagement in each hollow between teeth, to remove the burrs from, and bevel, the corresponding tooth edges, said means comprising a bell-crank lever rigid with said follower and co-acting with a slide controlling the milling head for converting the radial movement of said follower into a transverse movement of said milling head in relation to the wheel to be treated, this device comprising if desired two milling heads for treating simultaneously both faces of a same gear.

9 Claims, 13 Drawing Figures

DEVICE FOR TRIMMING AND BEVELLING GEAR TEETH

This invention relates in general to the trimming and bevelling of gear teeth and notably the teeth of cylindrical pinions having spur or helical teeth, such as the idle pinions of gearboxes or the like.

The problem to be solved consists in removing the lateral burrs of teeth machined during the rough cutting of the pinion blank, and forming a bevel of sufficient width along the side edges of the teeth hollows so that the finishing operation, more particularly the rolling operation, can be performed without any risk of creating a back driving of metal on the pinion faces. To this end, the burrs generated during the rolling operation must find a way out into the gaps created by the bevels in order not to impair the flatness of the surfaces (one specific face being taken as a reference face for the bore honing operation, for example).

Burr-removing or trimming devices are already known which operate by brushing. However, these devices are ill suited for removing relatively thick burrs generated during the gear cutting operation and cannot be used for forming bevels.

Other devices are known which are capable of trimming and possibly bevelling the pinions. These devices comprise a disk-shaped grinding wheel, but the use of a tool of this kind is objectionable in that it usually leaves in the pinion surface abrasive particles extremely detrimental to the subsequent finishing operation (by rolling or shaving, for instance), notably in that they produce a premature wear of the finishing tool.

Neither can a disk-type grinding wheel lend itself conveniently to the trimming of teeth close to a shoulder, as commonly observed in the case of dog teeth used in gearboxes.

The use of a mother grinding wheel meshing with the pinion itself makes it compulsory to use a specific tool per pinion type, without removing the inconveniences characterising grinding wheels.

Other devices operate in the fashion of copying machines requiring a guiding templet and are relatively complicated.

Finally, some other known devices utilize special tools requiring the rotational indexing of the pinions or gears on their support and the use of a dividing or graduating machine having the same number of teeth as the pinions to be treated.

Other devices proposed in this specific field comprise a wheel meshing with the pinion and adapted to upset the metal before removing same with the assistance of scraping tools, but this method is obviously inadequate for obtaining the desired aforementioned bevels, and furthermore it requires the use of specific tools for each type of pinion.

It is the primary object of the present invention to provide a device for trimming and bevelling the teeth of toothed wheels and pinions without the above-mentioned inconveniences, this device being in addition simple and reliable. Basically, the gear teeth trimming and bevelling device according to this invention, which comprises a device for rotatably driving the wheel to be treated, at least one milling head of which the milling cutter is adapted to engage the side edges of the gear teeth, a follower adapted to follow radially the tooth outline of the rotating gear, and means responsive to said follower for shifting the milling cutter in a plane across said wheel in order to cause said cutter in synchronism with the wheel rotation and by temporary outline engagement with each hollow between teeth to bevel the corresponding teeth, is characterised in that said means comprise a bell-crank level rigid with said follower and co-acting with a slide engaging the milling head for converting the radial movement of said follower into a transverse movement of said milling head in relation to the wheel to be treated.

According to a complementary and particularly advantageous arrangement of this invention, the device may comprise a pair of milling heads disposed on either side of the wheel plane so as to treat the teeth of said wheel simultaneously on both faces and thus increasing considerably the rate of operation already obtained with a single milling head.

Other features characterising this device are, inter alia:

that it is particularly convenient for using a milling cutter of relatively low cost permitting the trimming and bevelling of untreated workpieces;

that it does not require a preliminary study of the tool (milling cutter) which has a very simple shape (small carbide cutter of the standard commercial type, having a pointed configuration and a shaving-breaking cut);

that it is capable of forming, when necessary, a relatively large bevel distributed throughout the outline of the tooth hollow, or on one portion only thereof;

that it requires only a simple mechanism without any rotational indexing of the workpiece on its mounting, and without any dividing or graduating machine; and that its kinematics is extremely simplified and easily adaptable to an automatic feed system.

Two typical forms of embodiment of this invention will now be described by way of example with reference to the attached drawings, in which.

Figure 1:
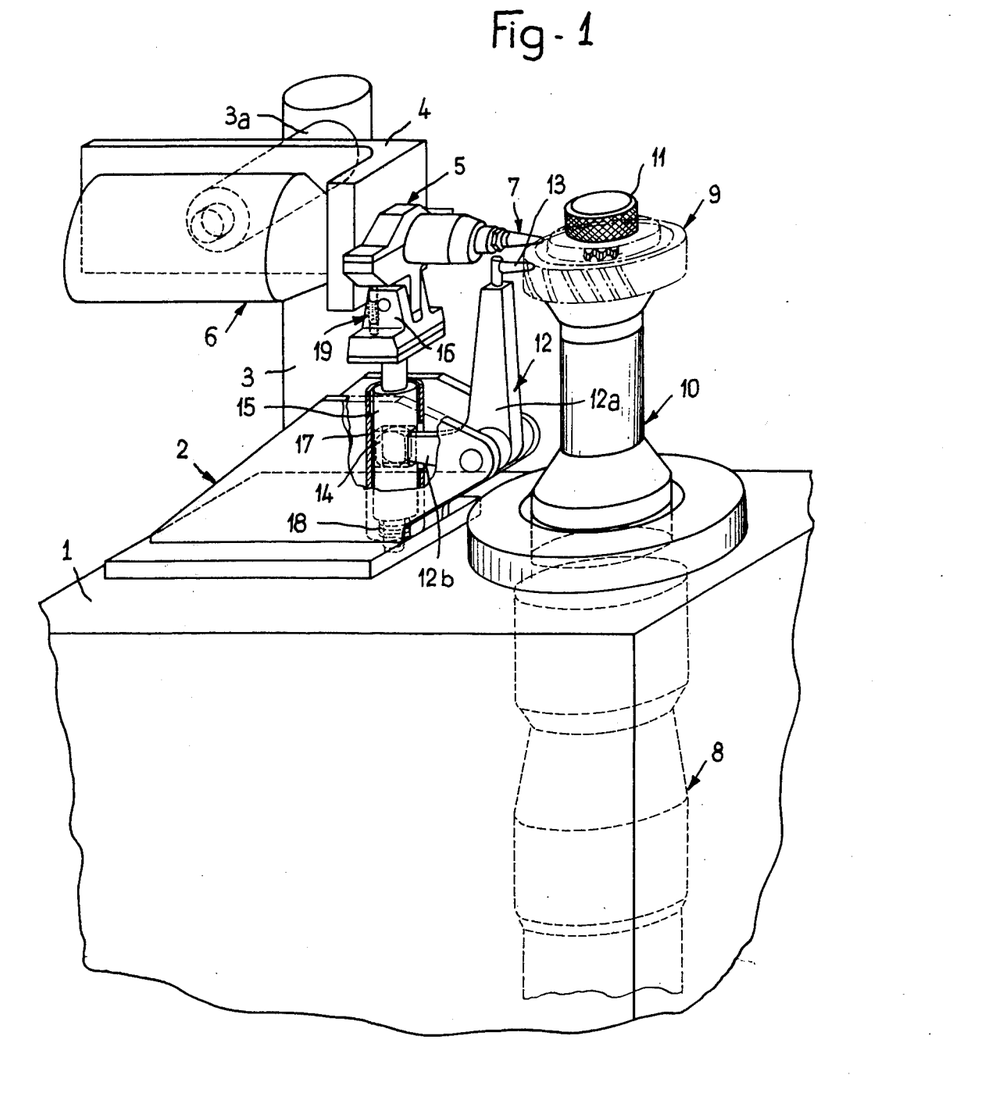
FIG. 1 is a perspective view of a machine adapted to remove burrs from, or trim, a single face of a pinion or gear.

The machine illustrated in FIG. 1 comprises a frame structure 1 having rigidly mounted on its top surface a straplike bracket 2 rigidly supporting in turn a vertical column 3 carrying a horizontal shaft 3a to which a horizontal right-angle of L-shaped bracket 4 is pivoted. A two-section collar 5 is secured to this bracket 4 for supporting a trimming or burr-removing milling head 6. This head 6 comprises in turn a high-speed motor (for instance a motor of which the output shaft rotates at 50,000 r.p.m.) rotatably driving a milling cutter 7.

Also mounted on this frame structure 1 is a motor and reducing gear unit 8 adapted rotatably to drive the pinion or like workpiece 9 to be trimmed, carried by a support 10. The means for clamping and centering the pinion 9 on this support 10 may, if desired, be controlled manually, for example through the medium of a screw 11 having a knurled or milled head, or through automatic means (not shown). In any case, this centering device does not require the presence of any means for rotatably indexing the pinion or like workpiece to be trimmed.

A bell-crank lever 12 fulcrumed to the strap-shaped bracket 2 and comprising two arms substantially perpendicular to each other carries at the outer end of its arm 12a normally extending upwardly and vertically a follower 13 adapted to engage in peripheral contact the pinion 9 to be trimmed, and at the outer end of its other arm 12b extending substantially horizontally a half-spherical portion 14 engaging a cylindrical vertically guided slide 15 rigid with a strap 16 to which the collar 5 supporting the trimming head 6 is pivoted. The cylindrical slide 15 is mounted in a tubular guide member 17 rigid with the strap-shaped bracket 2 and formed with a lateral cavity permitting the passage and movements of the arm 12b of lever 12. A coil return spring 18 interposed between the base of said cylindrical slideway 15 and the base of its guide member 17 constantly urges the follower 13 against the pinion 9 to be trimmed. Similarly, another coil spring 19 attached at one end to the collar 5 and at the opposite end to its supporting strap 16 is provided for controlling and damping the untimely and undesired jerks of the trimming head 6 due to its inherent inertia, especially during fast movements thereof.

Figure 7:
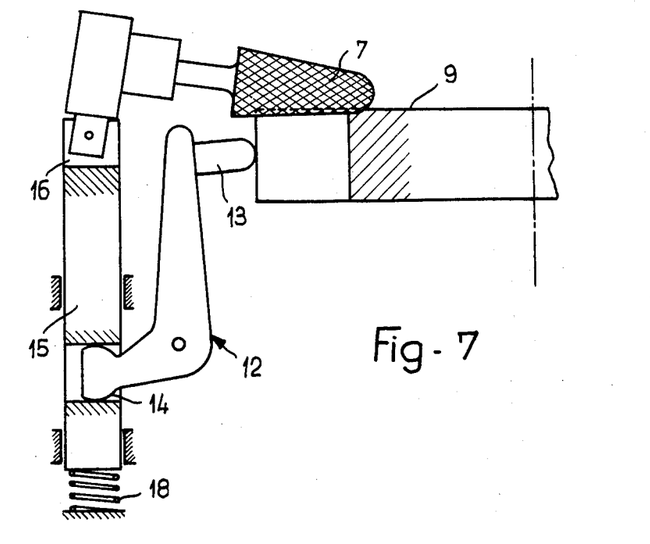
FIG. 7 is a fragmentary diagrammatic view of the single-head device illustrated in FIG. 1, showing the respective positions of the cutter and follower during the bevelling of a tooth hollow.
Figure 8:
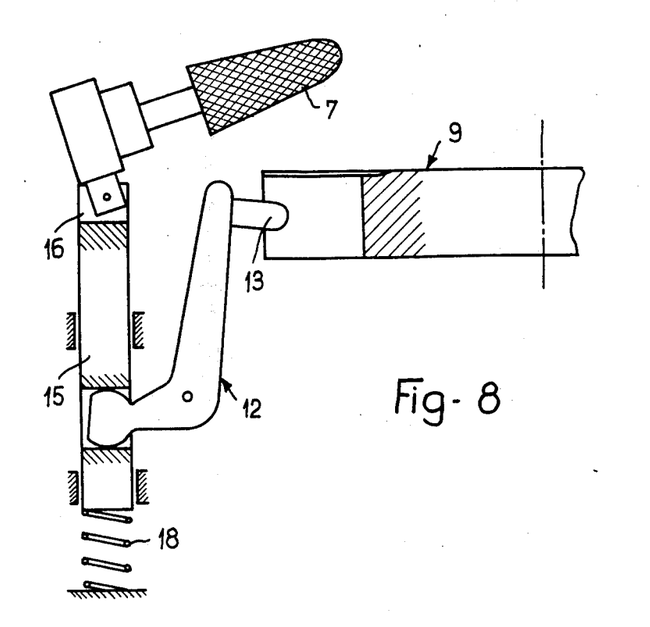
FIG. 8 is a fragmentary diagrammatic view showing the single-head device of FIG. 1 to illustrate the respective positions of the cutter and follower in the position there to clear said cutter.

Therefore, with the provision of the follower 13, in combination with the above-described transmission means, it is possible to synchronize the position of the milling cutter as a function of the relief of the workpiece or pinion 9 to be trimmed which is disposed vertically beneath the cutter, i.e. to bring the cutter to a lower operative position within the hollow of a pair of adjacent teeth, and to return the cutter to its upper, clearing position, outside the working area corresponding to the side face of the tooth hollow to be bevelled. To this end, in the device illustrated in FIG. 1, the respective positions of milling cutter 7 and follower 13 should be substantially shifted in a vertical plane by an odd number of half-tooth pitches of the pinion to be treated. This is evidenced by FIGS. 7 and 8 of the drawings, in which (FIG. 7) the position of follower 13 on one tip of tooth of pinion 9 is attended by the shifting of cutter 7 to its lower operative position, whereas in FIG. 8 the downward movement of follower 13 into the hollow between teeth involves the upward movement of the cutter 7 to its position clear from the top face of pinion 9.

Figure 2:
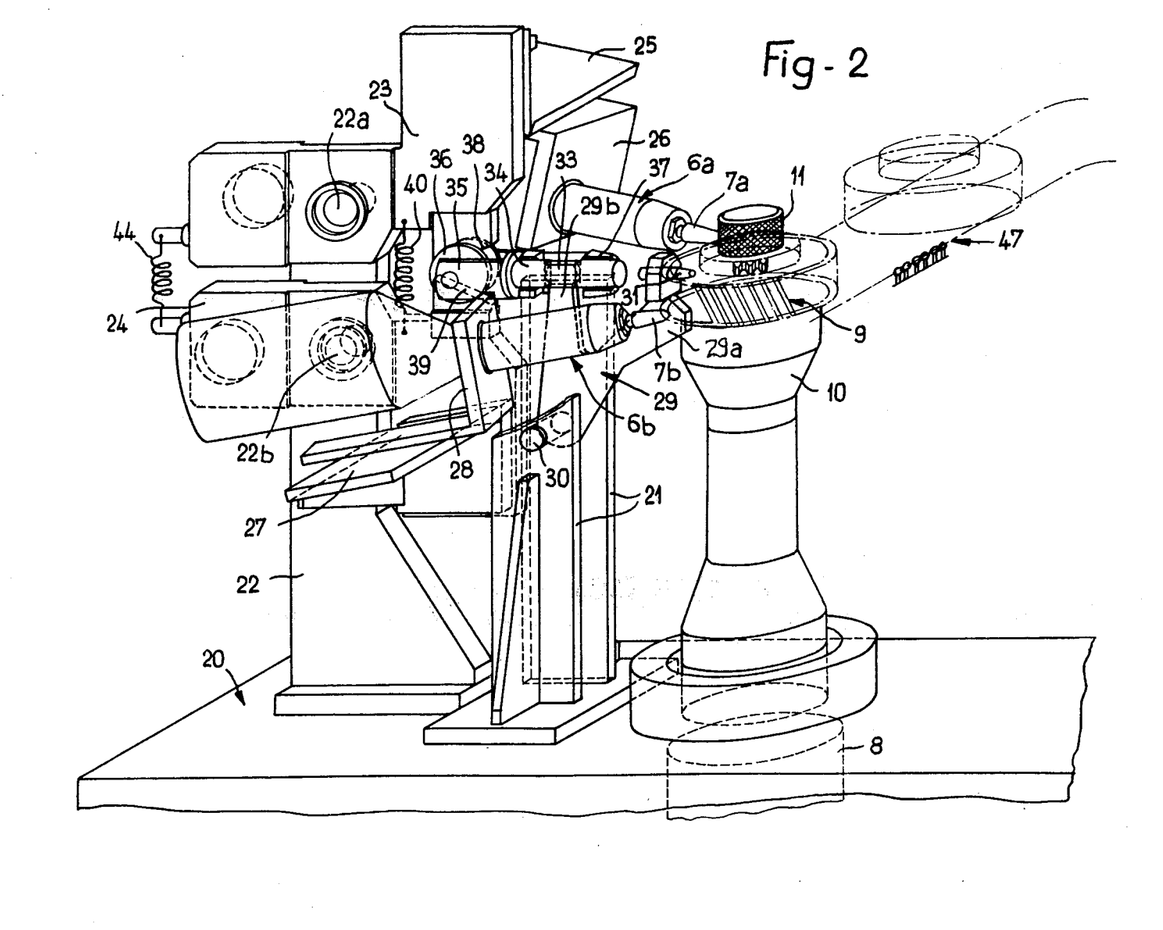
FIG. 2 is a perspective view of a machine intended for trimming the two faces of a pinion simultaneously.
Figures 3, 12:
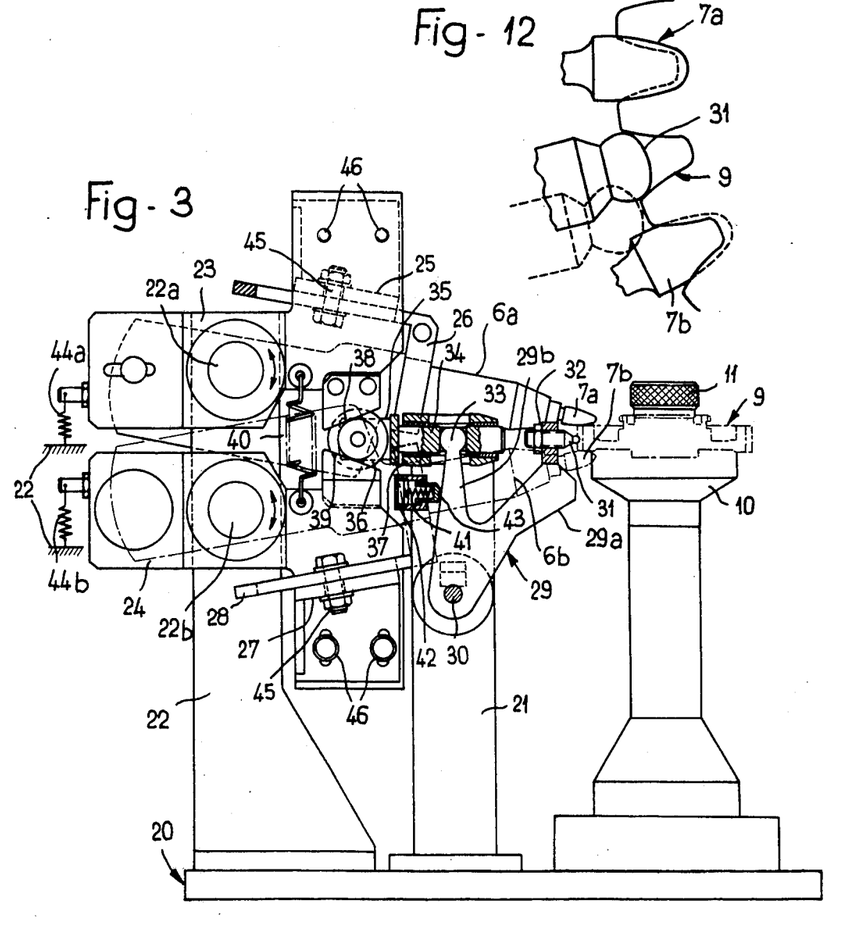
FIG. 3 is a part-sectional, part-elevational view of a machine according to FIG. 2, illustrating the means controlling the movement of the milling heads away from each other, as well as the means for adjusting the position of these heads in the space.
FIG. 12 is a detail plan view from above illustrating two positions of the follower and cutters, respectively, in the case of FIGS. 2 and 3.
Figure 4:
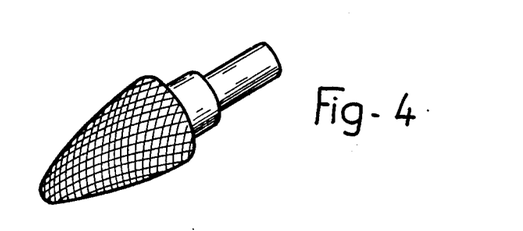
FIG. 4 is a perspective view of a pointed milling cutter with shaving-breaking section of the type used with the device of this invention.

The present invention is concerned more particularly with a device further characterised in that the two end faces of a pinion can be trimmed simultaneously, the preferred form of embodiment of this device being illustrated in FIGS. 2 and 3 of the drawings.

In this form of embodiment there is also included, as in the preceding one, a frame structure 20 supporting a motor and reducing gear unit 8 rotatably driving a pinion 9 to be trimmed which is centered to a support 10 by means of a clamping and centering device 11 of the manual or automatic control type but without any means for rotatably indexing the pinion.

Also mounted and secured to this frame structure 20 are a strap-shaped vertical bracket 21 and a supporting member 22 having substantially the same function as that of strap 2 and column 3 of the preceding form of embodiment.

The supporting member 22 comprises a pair of transverse horizontal shafts 22a and 22b superposed in a common vertical plane, on which the plates 23 and 24 supporting pairs of right angle or L-shaped brackets 25, 26 and 27, 28 are pivoted, respectively. The right-angle brackets 26, 28 support the trimming or milling heads 6a and 6b of which the head 6a set in the upper portion is adapted to trim, or remove the burrs from, the upper face of pinion 9 while the head 6b set in the lower portion is adapted to trim, or remove the burrs from, the lower face of this pinion. Thus, as will be explained presently, the pairs of right-angle brackets 25, 26 and 27, 28 are adapted to adjust the position and orientation of trimming heads 6a and 6b as a function of the type of pinion to be trimmed.

As in the preceding form of embodiment, a bell-crank lever 29 is pivoted by means of a transverse pin 30 in the strap 21. This lever 29 comprises two arms 29a and 29b forming together an acute angle in comparison with the preceding one. The outer end of arm 29a carries a follower 31 serving the same purpose as in the preceding form of embodiment and as illustrated in FIG. 3, this follower 31 comprises at its end opposite the end engaging the pinion to be trimmed a screw-threaded portion for fastening the follower 31 by screwing in conjunction with a lock nut 32 to permit a fine adjustment of the position 24 of said follower.

The outer end of the other arm 29b of lever 29 carries a half-spherical portion 33 fitted in a cylindrical slide 34 rigid with another strap 35 supporting in turn a grooved roller 36. The cylindrical slide 34 is mounted in a substantially horizontal tubular guide member 37 rigid with said strap 21 and comprising a lateral recess permitting the passage and movements of said arm 29b.

When the slide 34 is moved in its guide 37 the grooved roller 36 co-acts simultaneously with a pair of cam faces 38 and 39 rigid with supporting plates 23 and 24, respectively. These cam faces converge to a point located opposite said follower 31 and thus form an open angle facing the roller 36.

A relatively strong coil spring 40 attached at its end to each supporting plate 23 and 24, respectively, in the gap left between the shafts 22a and 22b constituting the fulcrum pins of cam faces 38 and 39, respectively, constantly urge said cam faces for engagement with said roller 36. In parallel therewith, another helical spring 41 housed in a case 42 rigid with strap 21 (see FIG. 3) urges through a tappet 43 the arm 29b of lever 29 in order to ensure a constant engagement between the follower 31 and the pinion 9 to be trimmed. Moreover, a third coil spring 44 (see FIG. 2) interconnects the ends of supporting plates 23 and 24 which, in relation to the shafts 22a and 22b, are opposite said cam faces 38, 39 in order to balance the inertia weights of the heads and ancillary components in relation to said shafts 22a and 22b. In a preferred modified form of embodiment illustrated diagrammatically in FIG. 3, the single coil spring 44 of FIG. 2 is replaced by a pair of springs 44a and 44b each anchored respectively by one of their ends to the supporting plates 23 and 24 and by their opposite ends to the supporting member 22 rigid with the frame structure 1 of the machine, in order to ensure a more accurate balancing of the inertia weights of the trimming heads and ancillary component elements.

The position of follower 31 will thus permit, through the above-described means for transmitting the motion, namely in the operating order lever 29, slide 34, roller 36 and cam faces 38, 39, of pivoting the supporting plates 23 and 24 about the shafts 22a and 22b, for determining the respective positions of milling cutters 7a and 7b of trimming heads 6a and 6b in relation to the end faces of the pinion 9 to be treated. Thus, to a retracted position of follower 31 (located at the tip of a tooth, as shown in dash lines in FIG. 12 overlying FIG. 3) there corresponds a greater relative spacing of cam face 38 and 39, thus causing the trimming heads 6a and 6b (of which the cutters 7a and 7b are therefore cleared from the faces of pinion 9) to be moved away from each other. Inversely, to an advanced position of follower 31 (the follower 31 engaging the hollow formed between two adjacent teeth of the pinion, as shown in thick lines in FIG. 12) there corresponds a reduced relative spacing of cam faces 38 and 39, thus causing the trimming heads 6a and 6b (of which the cutters 7a and 7b are thus in engagement with the pinion faces) to move toward each other, i.e. to their operative positions.

It will be seen that in this modified embodiment comprising two trimming heads the clearing position of milling cutters 7a, 7b corresponds to the clearing position of follower 31, whereas in the preceding modified form of embodiment comprising a single trimming head the clearing position of the milling cutter corresponds to the engaged position of follower 13.

It may also be seen that, theoretically, in the case of a spur pinion, the geometrical axes of milling cutters 7a and 7b should be substantially shifted in the vertical plane on either side of the axis of follower 31 by at least one tooth pitch of the pinion 9 to be trimmed, and that all these axes should tend to converge with one another in the operative position at the level of the axis of the pinion to be trimmed, it being understood of course that in the case of a helical gear adequate corrections should be brought to the above data.

Therefore, the trimming heads are adjusted as follows:

As a function of the diameter and helix angle of the pinion to be trimmed, the right-angle members 26, 28 should be positioned in relation to right-angle members 25 and 27. This positioning step is performed by means of screw and nut assemblies 45 provided for fastening each right-angle bracket 26 and 28 in position to each right-angle bracket 25, 27 in apertures formed in the former brackets 26, 28, as illustrated in FIG. 3.

According to the pinion width or thickness, and also to the depth or width of the bevel to be formed, the heads 6a and 6b are positioned in a vertical plane by adjusting the position of right-angle brackets 25, 27 in relation to said supporting plates 23 and 24. As illustrated in FIG. 3, this positioning operation is also performed by means of screw and nut assemblies 46 provided for fastening each right-angle bracket to each supporting plate 23 and 24 in apertures formed in said brackets 25 and 27.

A fine adjustment of the position of follower 31 as described hereinabove may be used for slightly altering the geometrical shape of the bevel.

Figure 5:
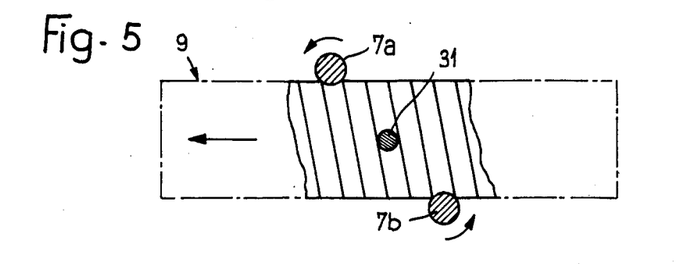
FIG. 5 is a diagrammatic view illustrating the arrangement and direction of rotation of the milling cutters when bevelling a helical pinion comprising a left-hand helix, by using the twin-head device illustrated in FIGS. 2 and 3.
Figure 6:
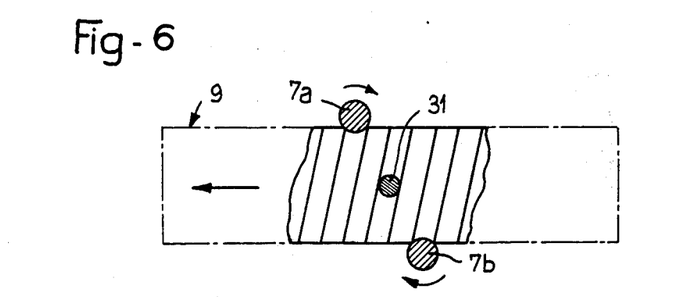
FIG. 6 is a diagrammatic view illustrating the arrangement and direction of rotation of the milling cutters when bevelling a helical pinion having a right-hand helix, by using the twin-head device illustrated in FIGS. 2 and 3.

In the case of a helical gear, the direction of rotation of the cutters is subordinate to the gear helix angle, so that the metal is cut by rising on the acute angle of the tooth surfaces, as illustrated in FIGS. 5 and 6 (FIG. 5 showing a left-angle helix and FIG. 6 a right-angle helix).

Figure 11:
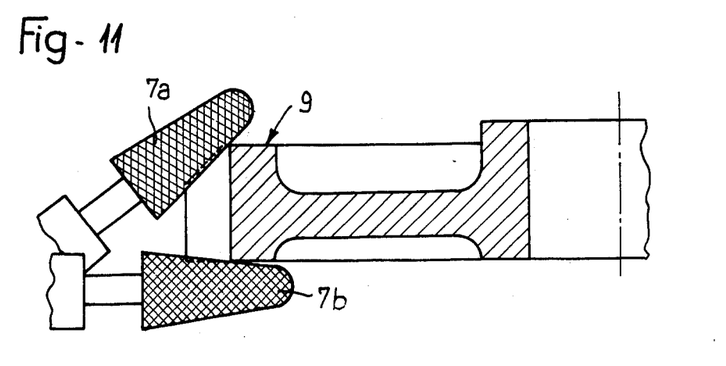
FIG. 11 is a fragmentary view showing the possibility of trimming simultaneously the two faces of a pinion of which one face already comprises a bevelled portion.

The device according to this invention is also advantageous in that, with the above-described means for adjusting and controlling the operative position of the trimming head, it is possible to trim simultaneously both faces of a pinion of which one face is already provided with a bevelled portion (see FIG. 11), this constituting a marked improvement over the prior art devices.

Moreover, the device according to this invention may easily be incorporated in a mass-production line by providing means for automatically clamping and releasing the workpieces, for example under pneumatic control, in combination with automatic feed means as illustrated diagrammatically at 47 in FIG. 2.

Figures 9, 13:
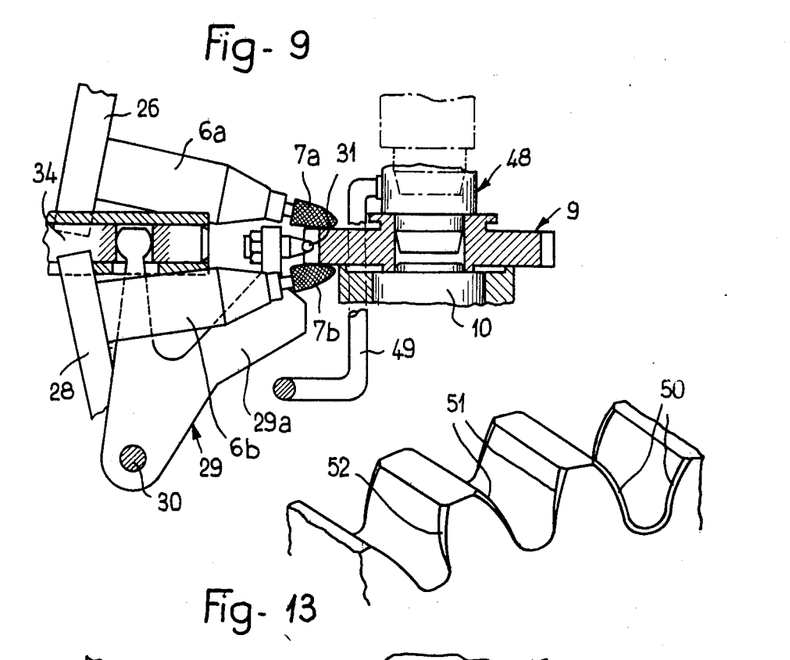
FIG. 9 is a fragmentary diagrammatic view showing means for retracting the follower and automatically raising the trimming heads in the twin-head device illustrated in FIGS. 2 and 3, in the position for clamping the pinion to be treated.
FIG. 13 is a detail perspective view of one portion of a pinion to illustrate bevel modifications obtainable with the device of this invention.
Figure 10:
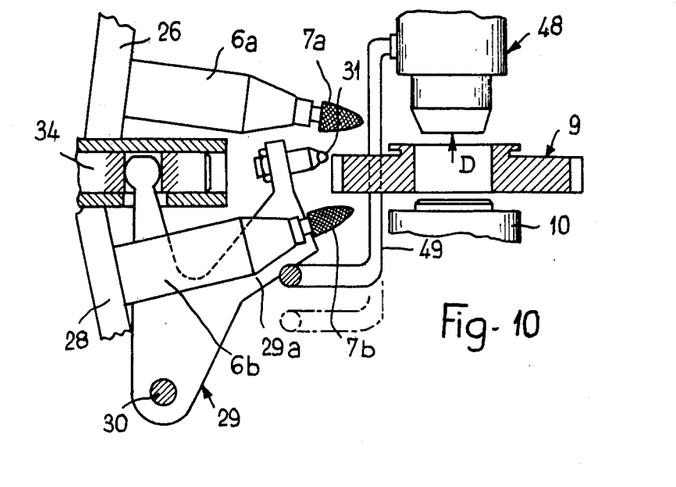
FIG. 10 is a fragmentary diagrammatic view showing the system of FIG. 9 for retracting the follower and automatically raising the trimming heads in the twin-head device illustrated in FIGS. 2 and 3, in the release position of the pinion to be treated.

In this case, the retraction of follower 31 and the automatic raising of the trimming heads 6a and 6b can be performed automatically at the end of the operating cycle in connection with the release of the workpiece itself, as illustrated in FIGS. 9 and 10. As clearly shown in these Figures, when releasing the pinion 9 to be trimmed a pneumatic mandrel 48 provided for clamping this pinion 9 carries along, during its upward stroke (in the direction of the arrow D), an arm 49 rigid therewith and shaped to abute the lower face of arm 29a of lever 29, in order to pivot this level about its fulcrum 30. Thus, by pushing back the roller 36 the cam faces 38 and 39 can be moved apart and the follower 31 can be released from the hollow between teeth of said pinion while moving the cutters 7a and 7b sufficiently away from the pinion to permit the removal thereof from its mounting.

This example should not be construed as limiting the present invention for other modifications and changes may be contemplated without departing from the basic principles of the invention as will readily appear to those skilled in the art.

Thus, although the pinions illustrated in the Figures concerning the above-described forms of embodiment are spur pinions or cylindrical gears, it is clear that the device according to this invention may also be used for trimming and bevelling bevel pinions by simply adapting the relative positioning of the milling cutter heads and the mounting of said pinions.

Whatever the type of pinion to be trimmed, the device according to this invention permits of obtaining indifferently, according to specific requirements and also to the positionings and cutter outlines contemplated, modified bevels as illustrated in FIG. 13, wherein 50 designates a constant-width bevel, 51 being a bevel formed along one portion only of each side of a tooth hollow, and 52 a bevel covering only one portion of a single side of a tooth hollow when the pinion is contemplated for an application wherein the teeth work only and constantly in one direction, so that the finishing step is required only on the corresponding working sides.

I claim:

1. A device for removing the burrs from, and bevelling, gear teeth, comprising means for rotatably driving the gear to be treated, a first milling head mounted on a movable support, a milling cutter mounted for rotation in said milling head, a finger-shaped follower having a bearing surface to engage the periphery of the gear and to penetrate the space between adjacent gear teeth, whereby rotation of said gear imparts radial movement of said follower conforming to the peripheral outline of the gear, a bell-crank lever mounted on a pivot rigidly having a first arm connected to said follower, and a second arm rigid with said first arm and having means engaging a slide for movement therewith, said slide movable within a fixed guide, said slide having means engaging said movable support to move said milling head and said milling cutter transverse to said gear so that said milling cutter operates on said gear teeth.

2. A device according to claim 1, wherein said slide is pivotally connected to the movable support of said first milling head, said movable support being pivotable to move said cutter transverse to said gear.

3. A device according to claim 1, further comprising a second milling head, a second milling cutter mounted for rotation in said second milling head, said first and second milling heads disposed on opposite sides of the plane of the gear, said second milling head mounted on second movable support, wherein said slide cooperates with the first and second movable supports so as to impart transverse movement of said first and second cutters.

4. A device according to claim 3, wherein said slide is disposed substantially radially in relation to said gear and comprises a roller interposed between two cam faces each rigid with said first and second movable supports, said movable supports being pivoted, whereby said first and second milling heads operate in phase on two faces of the gear.

5. A device according to claim 4, wherein said cutters are spaced from said follower by at least one tooth pitch on either side of said follower.

6. A device according to claim 1, which comprises a pneumatic mandrel for clamping and centering the gears to be treated on the means for rotatably driving them, co-acting means being provided between said mandrel and said follower for clearing said follower and each milling head from the gear when said pneumatic mandrel is in a position clear from the gear to be treated.

7. Device according to claim 4, wherein said first and second milling heads are urged by spring means to a position in which said cam faces engage said roller.

8. Device according to claim 3, wherein said milling heads are interconnected by spring means for balancing their inertia weights.

9. Device according to claim 3, wherein said milling heads are connected separately to the frame structure of the device by means of a spring for balancing their inertia weights.

* * * * *